(12) United States Patent
Kelly et al.

(10) Patent No.: US 7,361,300 B2
(45) Date of Patent: Apr. 22, 2008

(54) METHOD OF MAKING EXTENDED AREA FILTER

(75) Inventors: William R. Kelly, Prospect, CT (US); Larry Moore, Hamden, CT (US)

(73) Assignee: MOTT Corporation, Farmington, CT (US)

( * ) Notice: Subject to any disclaimer, the term of this patent is extended or adjusted under 35 U.S.C. 154(b) by 338 days.

(21) Appl. No.: 10/639,367

(22) Filed: Aug. 12, 2003

(65) Prior Publication Data

US 2005/0035052 A1    Feb. 17, 2005

(51) Int. Cl.
*B22F 7/06*    (2006.01)
(52) U.S. Cl. .............................. 419/2; 419/6
(58) Field of Classification Search ............... 419/2, 419/6
See application file for complete search history.

(56) References Cited

U.S. PATENT DOCUMENTS

| | | | |
|---|---|---|---|
| 3,354,250 A | 11/1967 | Killoran | |
| 3,488,806 A | 1/1970 | Fletcher | |
| 3,570,059 A | 3/1971 | Mott | |
| 3,581,902 A | 6/1971 | Bidler | |
| 3,746,642 A | 7/1973 | Bergstrom | |
| 3,788,486 A | 1/1974 | Bergstrom | |
| 3,933,652 A * | 1/1976 | Weichselbaum et al. | 210/446 |
| 4,287,068 A | 9/1981 | Bewley | |
| 4,522,692 A | 6/1985 | Joslin | |
| 4,828,930 A | 5/1989 | Koehler | |
| 5,141,638 A | 8/1992 | Mori et al. | |
| 5,545,323 A * | 8/1996 | Koehler et al. | 210/493.2 |
| 5,625,861 A * | 4/1997 | Nishi et al. | 419/2 |
| 5,882,517 A | 3/1999 | Chen et al. | |
| 5,916,443 A | 6/1999 | Mueller et al. | |
| 5,937,263 A * | 8/1999 | Eisenmann et al. | 419/2 |
| 5,940,674 A * | 8/1999 | Sachs et al. | 419/2 |
| 5,993,502 A * | 11/1999 | Motoki et al. | 55/487 |
| 6,080,219 A * | 6/2000 | Jha et al. | 55/486 |
| 6,355,082 B1 * | 3/2002 | Ishibe | 55/528 |
| 2005/0035051 A1 * | 2/2005 | Kelly et al. | 210/435 |

FOREIGN PATENT DOCUMENTS

WO    02/057035 A1    7/2002

\* cited by examiner

*Primary Examiner*—George P. Wyszomierski
(74) *Attorney, Agent, or Firm*—Wilmer Cutler Pickering Hale and Dorr LLP

(57) ABSTRACT

Methods are provided for making a porous filter that is useful in polymer melt spinning. The methods include pressing particles, such as a metal powder, to form a filter having a filter body integrally formed with a top cap and a bottom cap. The filter body and caps are formed as a single component or, alternatively, are formed as two or three separate parts that are fitted and pressed together to form a single component having blind inlet and outlet cavities. After pressing, the component is sintered to form the porous filter. The particles are pressed and cohere to form the caps and filter body without the use of a polymeric binder, and the inlet and outlet cavities are formed substantially without machining.

34 Claims, 3 Drawing Sheets

METHOD OF MAKING EXTENDED AREA FILTER

BACKGROUND

1. Field of the Invention

The invention relates to filtration during polymer melt spinning, and in particular to porous filters for use in spin pack assemblies.

2. Description of Related Art

Synthetic polymer fibers typically are manufactured by extruding filaments of molten polymer under pressure through openings in plates called "spinnerettes," which are contained in "spinnerette heads" in spinning units known as "spin packs." Before extrusion through the spinnerette, the polymer melt must be filtered to remove solid contaminants and gelled polymer particles. Unless removed by filtration, such impurities can clog the spinnerette or pass through the spinnerette and cause defects in the product polymer fiber.

Various filtration systems have been used in spin packs to filter the polymer melt immediately prior to extrusion through the spinnerette. Ideally, the filtration media should retain particulate impurities and also impart shear, i.e., induce alignment and reduce cross-linking between polymer chains. Known filtration media include sand, shattered metal, metal fiber, screen packs, and porous metal discs and cups. A traditional spin pack filtration assembly includes loose filtration media, such as sand or shattered metal. The loose fill is assembled in situ at the site of polymer filtration as a layered bed confined between screens, and a sealing ring is used to seal the filtration assembly within the spin pack and prevent polymer leakage. The bed of loose fill generally includes multiple layers of particles, with each layer having progressively finer particle size. These layers create a depth filtration effect, which prolongs the life of the filter because larger contaminant particles are removed by the coarse upstream filtration layers, leaving the finer downstream filtration layers open to retain smaller contaminant particles. However, loose media do not provide optimal filtration, as they tend to migrate, separate, channel, and fluidize. Such irregular, uncontrollable motion of the particles of loose fill reduces filtration effectiveness and causes inconsistent filtration over the life of a filter and across filters. Similarly to traditional loose fill, metal fiber has a soft, weak structure that must be surrounded by screens to prevent migration under pressure. Further, metal fiber has a large open void volume, which affords great dirt holding capacity but has limited ability to impart shear.

Porous metal discs and cups have a fixed, sintered structure that provides good shear and affords controlled, consistent filtration because it is not subject to migration. However, traditional porous metal filters often have difficulty withstanding the high pressures used in polymer melt extrusion or, if they are thick enough to withstand such pressures, afford sub-optimal flow rates. Furthermore, porous metal discs and cups often suffer from reduced filtration life due to surface blinding and caking.

To reduce the pressure drop across the filter and improve filtration life, sintered metal filters having extended filter surface area have been made. Some such extended area filters include cylindrical or conical cavities defined by multiple distinct tubular filter elements (e.g., Mott, U.S. Pat. No. 3,570,059) or an integral cavity-containing structure (e.g., Bergstrom, U.S. Pat. Nos. 3,746,642 and 3,788,486). Such filters offer extended filtration area, but sometimes include a multi-component assembly (e.g., a group of cups in an adapter) that is subject to leakage between components. Furthermore, many extended area filters require a thick inter-cavity wall structure to afford sufficient strength for high-pressure applications, which adversely affects flow rate and throughput. In addition, surrounding support structure (e.g., breaker plate and screens) is often required to prevent the filter from bending, fracturing, or collapsing under pressure.

Furthermore, the production of many extended area filters is time-consuming and expensive, and some commonly used production steps cause shortcomings in the end product. For example, machining steps typically used to form the cavity structure of extended area filters often cause distortions in the pores and surface morphology of the filters, such as non-uniform density, smeared pores, and surface blinding. Such structural distortions result in reduced flow rate and consistency, and decreased filtration life. Another common production technique that causes drawbacks in the final filter product involves the use of polymeric binders. Extended area filters are often made from a dispersion of metal powder mixed with a binder. The use of such a dispersion can adversely affect the retention rating of the final filter product, e.g., due to non-uniformity of the dispersion, shear and damage to the metal particulate during mixing, and shelf life limitations of the dispersion. Moreover, the binder is later burned off from the final filter product, leaving behind polymer binder decomposition products, e.g., residual carbon, as contaminants that affect the corrosion resistance and surface chemistry of the filter.

Thus, a need remains in the art for new extended area filters, and methods of making the same, that provide controlled, consistent filtration with good flow rate and filtration life, and can be efficiently and cost-effectively manufactured, installed, serviced, and replaced.

SUMMARY

The invention provides methods of making an extended area filter that is particularly useful in polymer melt filtration. The filter offers improved uniformity of flow, increased throughput, and extended filtration life, and is efficiently and economically produced, installed, maintained, and replaced.

In one aspect, the invention provides a method of making an integral (i.e., single-component) porous filter. The method includes introducing particles into a mold having a desired shape for the filter. The shape includes an inlet end defining a plurality of inlet openings, an outlet end defining a plurality of outlet openings, a plurality of blind inlet cavities extending into the filter from the inlet openings, and a plurality of blind outlet cavities extending into the filter from the outlet openings. The method further includes applying pressure to the mold, thereby causing the particles to cohere and form a single component, and sintering the component to form the porous filter. The particles are pressed and cohere to form the component without the use of a polymeric binder, and the inlet and outlet cavities are formed substantially without machining.

In some embodiments of the method, isostatic pressing, metal injection molding, or split die techniques are used. In certain embodiments, the pressure applied to the mold is between about 3000 psi and about 5000 psi. In particular embodiments, sintering is performed in an atmosphere of hydrogen or a blend of hydrogen and nitrogen. In specific embodiments, the sintering atmosphere has a dew point at or lower than 40° F. In some embodiments, sintering is performed at a temperature between about 1800° F. and about 3000° F. In certain embodiments, sintering is performed for a time between about 20 minutes and about 2 hours. In particular embodiments, the mold is adjustable to provide for variations in the length of the filter.

In some embodiments, the particles comprise a metal powder. In certain embodiments, the metal powder has a U.S. Standard Sieve mesh size between about 12 and about 500, for example, 30/45 mesh, 50/100 mesh, or blends thereof. In particular embodiments, the metal powder has a particle size of about 1 µm or greater. In certain embodiments, the metal powder is stainless steel, nickel, tungsten, copper, bronze, or a combination thereof. In particular embodiments, the metal powder includes nickel and/or austenitic chromium-nickel stainless steel. In specific embodiments, the metal powder is water atomized.

Certain embodiments provide a filter produced by the method. In some embodiments, the filter has a nominal filtration rating between about 5 µm and about 110 µm. In alternative embodiments, the filter has a nominal filtration rating between about 0.1 µm and about 5 µm. In certain embodiments, the filter has a particle filtration efficiency in gas applications of at least about 90% for particles having a diameter greater than about 0.1 µm. In particular embodiments, the filter is approximately cylindrical in shape and has a length to diameter ratio of about 3:1 or less, and in some instances about 1:1 or less. In specific embodiments, the filter has a length between about 20 mm and about 50 mm, and a diameter of between about 30 mm and about 70 mm, for example, a length between about 30 mm and about 40 mm, and a diameter of about 50 mm.

Another aspect of the invention provides a method of making a porous filter having a filter body integrally formed with a top cap and a bottom cap. According to the method, a first plurality of particles is introduced into a first mold having a desired shape for the top cap. The shape defines a plurality of spaced inlet openings. Pressure is applied to the first mold, causing the first plurality of particles to cohere and form the top cap. A second plurality of particles is introduced into a second mold having a desired shape for the bottom cap integrally formed with the filter body. The shape defines a plurality of spaced outlet openings extending into a plurality of spaced outlet cavities, and a plurality of blind inlet cavities with a spacing corresponding to the spacing of the inlet openings in the top cap. Pressure is applied to the second mold, causing the second plurality of particles to cohere and form the integral bottom cap and filter body. The top cap is fitted together with the integrally formed bottom cap and filter body, whereby the inlet cavities are aligned with the inlet openings. The fitted top cap and integral filter body and bottom cap are compressed, causing them to cohere and form a single component. The single component defines a plurality of blind inlet cavities and a plurality of blind outlet cavities. The component is sintered to form the porous filter. The first and second pluralities of particles are pressed and cohere to form the top cap and the integral bottom cap and filter body without the use of a polymeric binder, and the inlet and outlet cavities are formed substantially without machining.

In some embodiments of the method, the shape of the top cap defines a plurality of protrusions with a spacing corresponding to the spacing of the outlet cavities in the integral filter body and bottom cap. The protrusions are aligned with the outlet cavities when the top cap is fitted together with the integral filter body and bottom cap. In certain embodiments, each of the first and second pluralities of particles comprises a metal powder.

Particular embodiments provide a filter produced by the method. In some embodiments, the filter has a nominal filtration rating between about 5 µm and about 110 µm. In alternative embodiments, the filter has a nominal filtration rating between about 0.1 µm and about 5 µm. In certain embodiments, the filter has a particle filtration efficiency in gas applications of at least about 90% for particles having a diameter greater than about 0.1 µm. In particular embodiments, the filter is approximately cylindrical in shape and has a length to diameter ratio of about 3:1 or less.

Still another aspect of the invention provides a method of making a porous filter having a filter body integrally formed with a top cap and a bottom cap. According to the method, a first plurality of particles is introduced into a first mold having a desired shape for the top cap. The shape defines a plurality of spaced inlet openings. Pressure is applied to the first mold, causing the first plurality of particles to cohere and form the top cap. A second plurality of particles is introduced into a second mold having a desired shape for the bottom cap. The shape defines a plurality of spaced outlet openings. Pressure is applied to the second mold, causing the second plurality of particles to cohere and form the bottom cap. A third plurality of particles is introduced into a third mold having a desired shape for the filter body. The shape defines a plurality of cavities with a spacing corresponding to the spacings of the inlet openings and the outlet openings. Pressure is applied to the third mold, causing the third plurality of particles to cohere and form the filter body. The top cap, filter body, and bottom cap are fitted together, whereby the cavities are aligned with the inlet openings and outlet openings. The fitted top cap, filter body, and bottom cap are compressed, causing them to cohere and form a single component. The single component defines a plurality of blind inlet cavities extending into the filter body from the inlet openings in the top cap, and a plurality of blind outlet cavities extending into the filter body from the outlet openings in the bottom cap. The component is sintered to form the porous filter. The first, second, and third pluralities of particles are pressed and cohere to form the top cap, filter body, and bottom cap without the use of a polymeric binder, and the inlet and outlet cavities are formed substantially without machining.

In some embodiments, the pressures applied to the first, second, and third molds are between about 3000 psi and about 5000 psi. In certain embodiments, the fitted top cap, filter body, and bottom cap are compressed at a pressure between about 1500 psi and about 2500 psi. In specific embodiments, at least one of the first, second, and third molds is adjustable to provide for variations in the length of the filter. In particular embodiments, the shape of the top cap defines a first plurality of protrusions having a spacing corresponding to the spacing of the outlet openings in the bottom cap, and the shape of the bottom cap defines a second plurality of protrusions having a spacing corresponding to the spacing of the inlet openings in the top cap. The first plurality of protrusions is aligned with the outlet openings and the second plurality of protrusions is aligned with the inlet openings when the top cap, filter body, and bottom cap are fitted together. In some embodiments, each of the first, second, and third pluralities of particles comprises a metal powder, for example, a water atomized metal powder. A filter produced by the method is also provided.

DETAILED DESCRIPTION

In certain embodiments, the invention provides an extended area filter and methods of making the same. A particularly useful application of the filter is in polymer melt spin pack assemblies for polymer melt filtration. The filter is a uniform porous body that is made, for example, of sintered powder metal, and contains multiple opposing spaced apart inlet and outlet cavities. The filter has a strong integral structure that provides good performance under high-pressure operating conditions. The filter has substantially uniform pore structure and density, and is substantially free from polymer binder decomposition products, allowing for more uniform flow with improved throughput and filtration life. The single-unit filter is easily fitted within a variety of standard spinnerette head assemblies using, for example, an adapter ring or an interference fit. The filter is made using processes that not only produce an improved filter, but also improve manufacturing efficiency and reduce manufacturing costs by eliminating traditionally employed polymer binders and secondary machining steps.

Figure 1A:
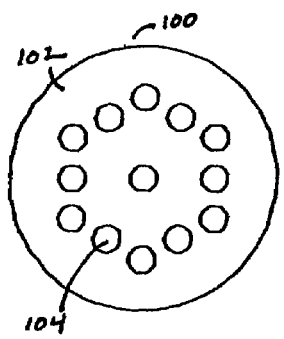
FIG. 1A is a top view of the inlet end of a filter according to certain embodiments of the invention.
Figure 1B:
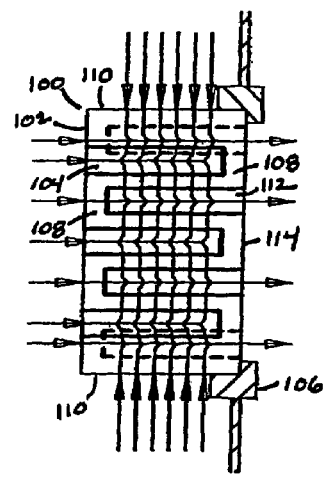
FIG. 1B is a cross-sectional view of a filter according to certain embodiments of the invention, with arrows indicating the flow of material to be filtered through the unit.
Figure 1C:
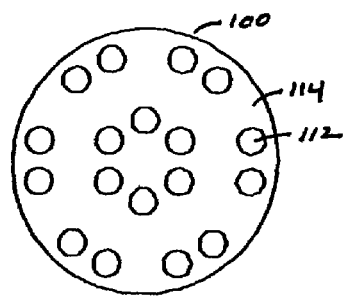
FIG. 1C is a top view of the outlet end of a filter according to certain embodiments of the invention.
Figure 1D:
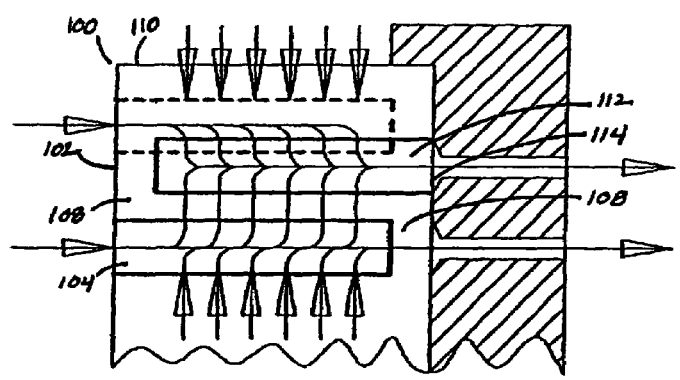
FIG. 1D is an expanded view of a portion of FIG. 1B, which is a cross-sectional view of a filter according to certain embodiments of the invention, with arrows indicating the flow of material to be filtered through the unit.

FIGS. 1A-D illustrate a filter 100 according to certain embodiments of the invention. FIG. 1A is a top view of the inlet end 102 of the filter 100. FIG. 1B is a cross-sectional view of the filter 100 mounted in a spinnerette head assembly. FIG. 1C is a top view of the outlet end 114 of the filter 100. FIG. 1D is a partial expanded view of FIG. 1B.

As shown in FIG. 1A, the inlet end 102 of the filter 100 contains a plurality of inlet cavities 104. The inlet cavities 104 are blind, i.e., open at one end and closed at the other end. Specifically, the inlet cavities 104 are open at the inlet end 102 but closed at the opposite end of the filter 100. The filter 100 is an integral, strong, rigid, uniform porous part that has been compressed from a particulate material and sintered. Useful materials for making the filter 100 include, but are not limited to, powder metals or metal fibers such as, for example, stainless steels, nickel, tungsten, copper, and the like, and alloys, e.g., bronze, as well as ceramics. In particular embodiments, a metal powder of nickel or austenitic chromium-nickel stainless steel is used. Particularly useful metal powders are water atomized materials that include rough, irregular-shaped particles, which interlock to form an inherently strong, rigid structure upon compaction. In at least some instances, the metal powder is sieved to a specific particle size distribution, or a blend of mesh sizes is selected, in order to yield a desired level of retention/filtration in the product filter. In certain embodiments, U.S. Standard Sieves are used to control the powder size distribution, which correlates to a final particle size retention rating. In some instances, powder metal with a mesh size (U.S. Standard Sieve) in the range of about 12 to about 500 is used. Non-limiting examples of useful mesh sizes include 30/45 mesh, 50/100 mesh, and blends thereof. The level of particulate retention of the final filter product is measured, for example, as a micron rating using a bubble point test (e.g., ASTM E128-61). In particular embodiments, metal powder is blended by mesh size to yield a final bubble point retention size micron rating between about 0.1 $\mu$m and about 150 $\mu$m. The filter retention size is sometimes referred to as a "nominal filtration rating." A filter retains particles with a diameter at or greater than its nominal filtration rating. In some embodiments, a filter is designed to have a nominal filtration rating that corresponds to a specific polymer grade being filtered. In particular embodiments, the filter has a nominal filtration rating between about 5 $\mu$m and about 110 $\mu$m, for example, about 10 $\mu$m, about 40 $\mu$m, about 60 $\mu$m, or about 100 $\mu$m.

In some alternative embodiments, a filter is provided for use in gas filtration applications. For at least some such applications, the filter has a nominal filtration rating less than about 5 $\mu$m, for example, as low as about 0.1 $\mu$m. Such a filter is made, for example, using a metal powder having a particle size (diameter) of about 1 $\mu$m or greater. In particular embodiments, a filter is provided with a particle filtration efficiency in gas applications of at least about 90% for particles having a diameter greater than about 0.1 $\mu$m (i.e., the filter captures at least about 90% of particles having a diameter greater than about 0.1 $\mu$m). In some instances, the filter has a particle filtration efficiency in gas applications of at least about 90% for particles having a diameter greater than about 1 $\mu$m, greater than about 5 $\mu$m, greater than about 10 $\mu$m, or greater than about 20 $\mu$m.

The filter 100 is a multi-cavity single element that reduces the costs and inefficiencies associated with some earlier extended area filters designs, such as an assembly of cups in an adapter. Besides requiring more labor for the combination of additional parts, such cup assemblies are often subject to leakage between the cups, and/or bending or fracturing of the cups during filtration. In contrast, the filter 100 is an efficient one-piece integral structure that is capable of handling operating pressures (e.g., 5000 psi) for various polymer melt spinning applications. Unlike many earlier extended area filters, the filter 100 does not require a support structure, such as a breaker plate and screens, to keep it from collapsing under operating pressures. The inherent structural rigidity of the filter 100 provides for improved filter integrity, leading to increased filter life. Furthermore, the strong sintered porous metal structure of the filter 100 allows for its inter-cavity walls to be less thick than those of many previous extended area filters. The thick wall construction of previous filters generally corresponds to longer cavities, which adversely affect flow rate and throughput. For example, some earlier extended area filters require a minimum wall thickness (distance between cavities) of approximately 0.09" for structural integrity during operation. In contrast, in at least some embodiments, the filter 100 has structural integrity with walls only about half that thickness. The ability to decrease the distance between cavities advantageously allows for a filter 100 having, for example, more than twice the filtration surface area compared to a typical extended area filter of the same envelope size that includes an assembly of cups.

Another structural advantage of the filter 100 is that its shape promotes uniform density in the final pressed part, thus allowing for more uniform flow, which results in a lower pressure drop across the filter and longer filtration life. A filter having uniform density is also desirable because practically the entire length of each filtration cavity provides useful filtration area. This is particularly beneficial compared to standard extended area filters having elongated tubular cavities, which are often subject to density distortions caused during pressing. Because the cavities in such filters are often much longer than they are wide, pressing to shape the part generally creates die wall friction, leading to non-uniform filter density. In some cases, the pores at the ends of the filter cavities are nearly blocked, such that only about half of the surface area of the cavities is useful for filtration. In particular embodiments, the filter 100 is die compacted to a length to diameter ratio of approximately 3:1 or less, for example, approximately 1:1 or less. The die wall friction during compaction is greatly reduced for diameter to length ratios in this range, thus allowing for creation of a more uniformly dense part with improved flow, and useful filtration area extending along virtually the entire length of each cavity. By way of comparison, in one embodiment, the filter 100 is about 50 mm in diameter×about 40 mm long. This filter 100 provides about twice the flow rate of a traditional cup assembly extended area filter, which has up to about 37 filter cups with approximately twice the length and surface area of the filter 100.

Thus, as illustrated in FIG. 1, some useful filters as described herein are cylindrical. In particular embodiments, a cylindrical filter 100 is provided with a length between about 20 mm and about 50 mm, and a diameter of between about 30 mm and about 70 mm. In specific embodiments, the filter 100 has a length between about 30 mm and about 40 mm, and a diameter of about 50 mm. In certain embodiments, a filter 100 is provided with a diameter raging from about 25 mm to about 150 mm and a length of up to about two times the diameter. In alternative embodiments, filters are provided in various different shapes and sizes. For example, filters are provided to fit into spinnerette head assemblies with filter housings having a variety of different configurations. By way of non-limiting example, in addition to cylindrical filters, filters in the form of square or rectangular solids, and kidney-shaped filters are contemplated.

FIG. 1B shows a cross-sectional view of the filter 100 secured in a spinnerette head assembly by an adapter ring 106. In various alternative embodiments, the filter 100 is installed (e.g., pressed-fit or adapted) in any of a variety of spinnerette head filter housings. The arrows in FIG. 1B (partial expanded view shown in FIG. 1D) indicate how material (e.g., polymer melt) to be filtered flows through the filter 100. As indicated by the arrows, external flow enters the inlet end 102 of the filter 100 through the inlet cavities 104 and the filter body 108. Advantageously, configuring the filter 100 as shown in FIG. 1B provides additional filtration area by allowing external flow to enter through the side walls 110 of the filter 100 as well. The material to be filtered then flows internally through the filter 100 until it passes through the filter body 108 or one of the blind outlet cavities 112 to exit the outlet end 114 of the filter 100.

As shown in FIG. 1C, the outlet end 114 of the filter 100 has outlet cavities 112 that are open at the outlet end 114 and closed at the opposite end of the filter 100. A comparison of FIGS. 1A and 1C indicates that, in the embodiment illustrated in FIG. 1, an interlocking pattern of equally spaced blind cavities is formed by the inlet cavities 104 and the outlet cavities 112 of the filter 100. In the illustrated embodiment, the thirteen inlet and eighteen outlet cavities 104, 112 are cylindrical, are all approximately the same size (e.g., about 5 mm in diameter), and are equally spaced in opposing directions with uniform parallel wall spacings (e.g., wall thickness between and around cavities of about 0.03" to about 0.125"). Controlling the wall thickness (e.g., to within about ±0.005") promotes uniform density throughout the filter. A filter arrangement as illustrated in FIG. 1 provides uniform flow throughout the filter. Further, such an arrangement allows for the filter 100 to be used in either flow direction, although flow in the direction illustrated in FIG. 1 makes better use of the available filtration surface area. Alternatively, cavities having various different sizes and/or spacings are used. For example, in certain instances tapered (e.g., conical) cavities or non-circular cavities are used. In specific embodiments, flat-sided, e.g., triangular or box-shaped, cavities are employed to increase the uniform cross-sectional area between cavities and increase the effective filtration surface area. In particular embodiments, cavities of the desired shape are die pressed in opposing directions, in some instances with parallel tolerances to within about 0.001" of each other. In at least some embodiments, the size of the cavities is large enough to allow for batch cleaning of the filter in a salt bath batch cleaning operation.

Figure 2A:
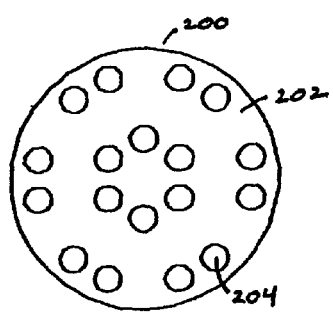
FIG. 2A is a top view of the inlet end of a filter according to certain embodiments of the invention.
Figure 2B:
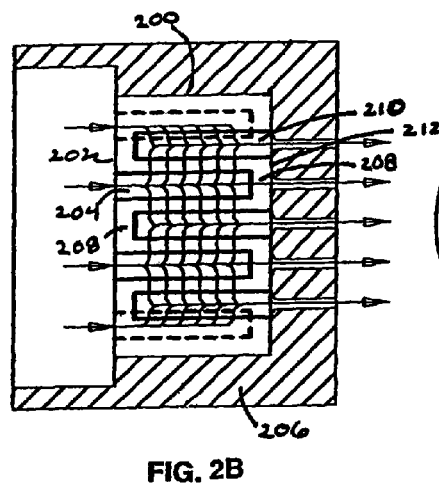
FIG. 2B is a cross-sectional view of a filter according to certain embodiments of the invention, fit into a media cup from a spinnerette head assembly, with arrows indicating the flow of material to be filtered through the unit.
Figure 2C:
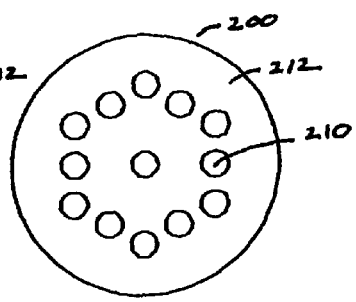
FIG. 2C is a top view of the outlet end of a filter according to certain embodiments of the invention.
Figure 2D:
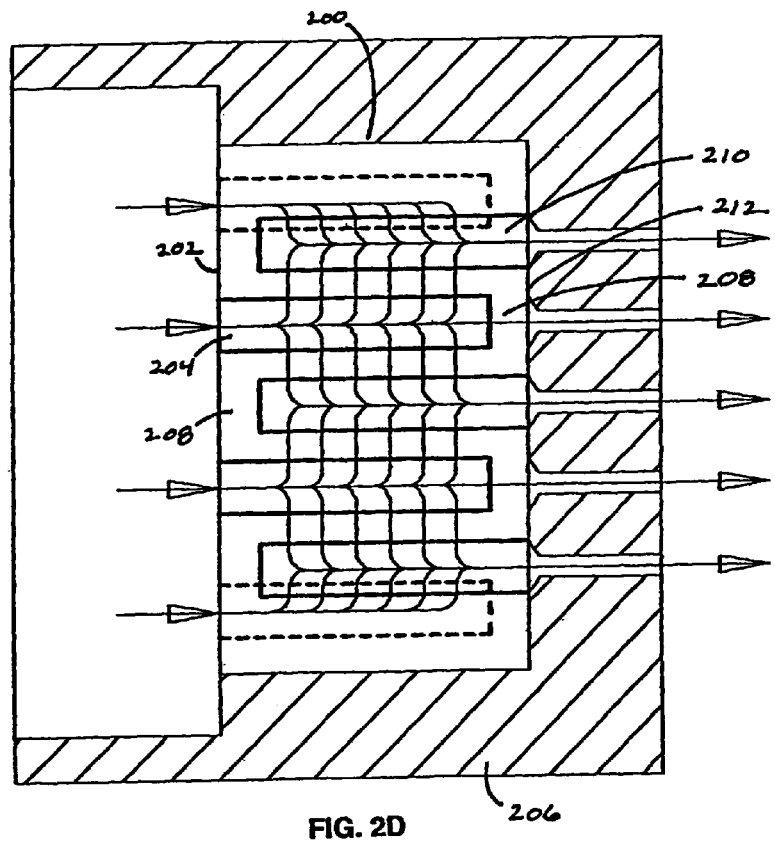
FIG. 2D is an expanded view of FIG. 2B, which is a cross-sectional view of a filter according to certain embodiments of the invention, fit into a media cup from a spinnerette head assembly, with arrows indicating the flow of material to be filtered through the unit.

FIGS. 2A-D illustrate a filter 200 according to certain embodiments of the invention. FIG. 2A is a top view of the inlet end 202 of the filter 200. FIG. 2B is a cross-sectional view of the filter 200 inserted in a media cup 206 from a spinnerette head assembly. FIG. 2C is a top view of the outlet end 212 of the filter 200. FIG. 2D is an expanded view of FIG. 2B.

As shown in FIG. 2A, the inlet end 202 of the filter 200 has blind inlet cavities 204 that are open at the inlet end 202 and closed at the opposite end of the filter 200. In the illustrated embodiment, eighteen inlet cavities 204 are employed. However, as described above, one of skill in the art will appreciate that the size, shape, number, and arrangement of cavities is varied as desired for a given application.

FIG. 2B is a cross-sectional view of the filter 200 fit into a media cup 206 from a spinnerette head assembly. In the illustrated embodiment, the filter 200 is pressed (interference fit) into the media cup 206, forming a seal. No adapter is required to fit the filter 200 into the media cup 206, thus simplifying the assembly. Such a filtration assembly advantageously eliminates the loose fill media that is traditionally used in media cups. Loose fill media is associated with problems such as channeling, media migration, and separation during use. The arrows in FIG. 2B indicate the flow of material to be filtered, with an expanded view shown in FIG. 2D. External flow enters the inlet end 202 of the filter 200 through the inlet cavities 204 and the filter body 208. The material to be filtered then flows internally through the filter 200 until it passes through the filter body 208 or one of the outlet cavities 210 to exit the outlet end 212 of the filter 200. The filter 200 is suitable for use in either flow direction, but the flow direction illustrated in FIG. 2 provides better use of the available filtration surface area. In some embodiments, the filter 200 is made with additional inlet cavities 204 because polymer melt does not enter through the side walls of the filter 200 housed within the media cup 206 as it does through the side walls 110 of the filter 100 mounted as illustrated in FIG. 1B.

As shown in FIG. 2C, the outlet end 212 of the filter 200 has blind outlet cavities 210 that are open at the outlet end 212 and closed at the opposite end of the filter 200. In the illustrated embodiment, thirteen outlet cavities 210 are employed. However, as described above, one of skill in the art will appreciate that the size, shape, number, and arrangement of cavities is varied as desired for a given application.

Figure 3A:
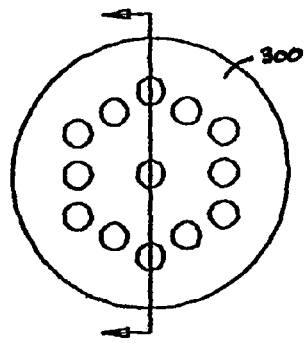
FIGS. 3A-C are top views of, respectively, the top cap, filter body, and bottom cap of a filter according to certain embodiments of the invention.
Figure 3B:
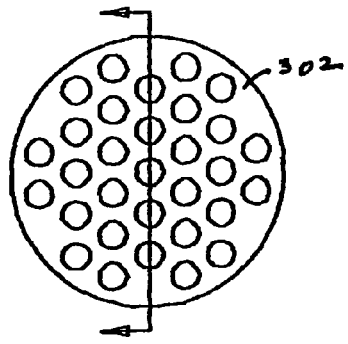
Figure 3C:
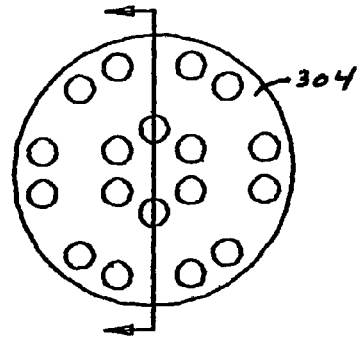
Figure 3D:
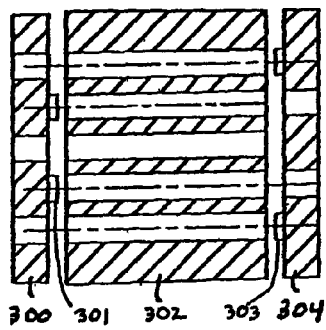
FIGS. 3D-F are cross-sectional views illustrating three possible methods of assembling a filter according to certain embodiments of the invention.
Figure 3E:
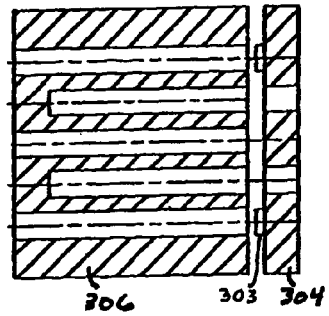
Figure 3F:
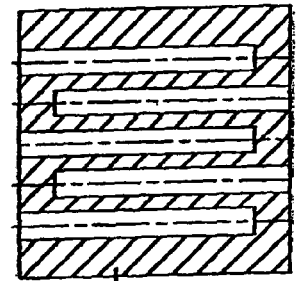

FIGS. 3A-C are top views of, respectively, the top cap 300, filter body 302, and bottom cap 304 of a filter according to certain embodiments of the invention. FIGS. 3D-F are cross-sectional views illustrating three possible methods of making a filter with parts as illustrated in FIGS. 3A-C.

FIG. 3D shows a top cap 300, filter body 302, and bottom cap 304 that, when assembled, create a filter. In the illustrated embodiment, the top cap 300 and bottom cap 304 have protrusions 301, 303 that facilitate alignment and assembly of the parts 300, 302, 304 to form a filter. In alternative embodiments, such protrusions are not included and the filter parts are aligned and assembled using other means, for example, an alignment pin. In certain embodiments, the three parts 300, 302, 304 are die pressed separately, the green (i.e., unsintered) parts are assembled and pressed together in a secondary pressing operation, and the resulting green filter is sintered. In some alternative embodiments, as illustrated in FIG. 3E, one end cap (the top cap in the illustrated embodiment) and the filter body are die pressed together as a single part 306, and the other end cap (the bottom cap 304 in the illustrated embodiment) is prepared separately. The two parts 304, 306 are then assembled, pressed together into a single component, and sintered. As shown in the illustrated embodiment, the bottom cap 304 optionally includes protrusions 303 that facilitate alignment and assembly of the parts 304, 306. In still other embodiments, as shown in FIG. 3F, a filter is made as a single part 308, e.g., using isostatic pressing, metal injection molding, or split die techniques, and then sintered. In some embodiments of the above-described die pressing methods, an open die with moving punches is used, allowing for adjustments to length (filter thickness) during production. This is an advantage over previous filter manufacturing processes, which often employ fixed cavity molds that are not able to be adjusted for length or provide in-process variations.

In certain embodiments, a sintered powder metal filter is prepared by feeding a controlled volume of blended water atomized metal powder to a die through a feed shoe. The powder is directly pressed in the die into a finished green part ready for assembly and/or sintering. The powder is pressed in a mold having the desired shape of the final filter or a sub-part thereof. Thus, the pressed green part has the desired shape, and machining is not required, e.g., to form or refine inlet and outlet cavities in the filter body. The metal feed stock does not change in consistency during the pressing cycle, allowing for a tightly controlled pore size distribution in the green compact. Compacting the water atomized metal particulate under pressure causes the irregular-shaped metal granules to interlock. This interlocking structure provides for a part that has good green strength and controlled permeability without the use of a binder such as the polymer materials typically used in porous filter production.

The ability to form a green part of sufficient strength without using a polymeric binder is advantageous because it eliminates the residual contaminants that are often left behind in the final filter product when the binder is burned off. Thus, unlike many previous extended area filters, the filter produced as described herein is substantially free from polymer binder decomposition products, e.g., residual carbon, which adversely affect the corrosion resistance and surface chemistry of the filter. Producing a filter without using a binder also avoids other problems. For example, traditional filter production methods employing a binder often begin by mixing a metal powder/binder dispersion. The use of such a dispersion can adversely affect the retention rating of the final product, e.g., due to non-uniformity of the dispersion or shear and damage to the metal particulate during mixing. Another advantage of production without a binder is that a dry blend of metal powder, unlike a metal/binder dispersion, has no shelf-life.

The above-described filter production method is also beneficial because the metal powder is directly pressed into the desired filter (or sub-part) shape, such that no additional machining is required, e.g., to form the filtration cavities. Eliminating secondary machining steps avoids the structural distortions, such as compacting, smeared pores, and surface blinding, that often are caused by traditional drilling and turning processes. The substantially uniform pore structure of a filter without such distortions provides improved flow rate and more uniform flow, leading to better throughput and increased filtration life.

Moreover, by eliminating one or more of the binder-associated processes and secondary machining steps used in many known methods for filter production, the above-described process allows for more streamlined, economic filter manufacture. For example, in at least some embodiments, the methods described herein allow for the elimination of the following steps employed in many common porous filter production methods: mixing a metal/binder slurry, forming a blank slug of metal/binder by heating and cooling in a die, curing the metal/binder resin (e.g., for about 30 hours), machining filter surfaces and/or cavities, burning off the binder (e.g., for about 7 hours), and performing quality control checks for residual carbon left in the filter after binder burn-off. Thus, the methods described herein provide for enhanced efficiency and reduced cost of filter production.

Once the green filter part or assembly has been formed as described above, it is sintered, for example, in an atmosphere of hydrogen or a blend of hydrogen and nitrogen (e.g. 87.5% hydrogen/12.5% nitrogen). In at least some embodiments, the sintering atmosphere has a dew point at or below 40° F. One of skill in the art will appreciate that the specific sintering conditions, including atmosphere, temperature, and duration of sintering, are chosen according to the particular application based on known sintering techniques. Typical sintering temperatures for powder metals range, for example, between about 1800° F. and about 3000° F., with sintering times between about 20 minutes and about 2 hours. In particular embodiments, a part made from austenitic chromium-nickel stainless steel or nickel powder is sintered at between about 2400° F. and about 2480° F. for between about 20 minutes and about 2 hours. Higher sintering temperatures often are used for ceramic materials, for example, at least about 3500° F.

The following non-limiting examples further illustrate particular embodiments of the invention:

EXAMPLE 1

An extended area filter was produced as illustrated in FIG. 3D. Dies were configured to produce the three discrete cavity patterns for the top cap, filter body, and bottom cap.

The powder metal tooling consisted of a carbide die, an upper punch, a lower punch, and core rods. The tools were adapted to a hydraulic die-set powder metal press. The following charge weights of 50/100 mesh blend of nickel powder were placed in the dies: 35 g for each of the top and bottom caps, and 185 g for the filter body. The parts were compacted to approximately 4000 psi, and then ejected from the dies. The parts were assembled, utilizing the alignment features molded into the top and bottom end caps, and pressed together at approximately 2000 psi. The resulting one-piece filter part was then sintered at approximately 2400° F. in a hydrogen atmosphere with a dew point less than 40° F. for 1½ hours.

The finished filter was approximately 50 mm in diameter× 30 mm tall. The filter had 13 filter cavities, each 5 mm in diameter×30 mm long. When oriented as illustrated in FIG. 1B, the cavity walls combined with the exposed filter body surface increased the effective filter surface area by approximately 4.5 times compared to a typical 50 mm porous disc filter. A bubble point measurement on the filter resulted in an absolute micron rating of approximately 15 µm.

For testing purposes, the sintered filter was pressed fit into a 60 mm adapter ring in a spinnerette assembly, replacing a previously used multi-element filter. The new filter operated at hydrostatic pressures of 1500 psi to 4000 psi, showing little sign of deflection.

EXAMPLE 2

An extended area filter was produced from an austenitic chromium-nickel stainless steel powder blend as illustrated in FIG. 3D, using similar procedures to those described in Example 1. The parts were pressed from a blend of 30/45 mesh powder in the following weights: 25 g for each of the top and bottom caps, and 172 g for the filter body. The part was then sintered at approximately 2450° F. in an atmosphere of 87.5% hydrogen and 12.5% nitrogen, with a dew point less than 40° F. for ½ hours.

The finished filter was approximately 50 mm in diameter× 30 mm tall. The filter had 18 filter cavities, each 5 mm in diameter×30 mm long. This design added approximately 3.5 times the effective filter surface area and provided about twice the flow rate compared to a typical sintered metal extended area filter assembly (31 cups pressed into a plate) of the same height and diameter. A bubble point measurement on the filter resulted in an absolute micron rating of approximately 40 µm.

The filter was pressed fit, with approximately 0.015" interference, into a standard 50 mm Barmag media cup (Barmag AG, Remscheid, Germany) using no more than 1400 psi force to insert it. This application eliminates loose fill media in the spinnerette head filter, and thus eliminates problems associated with the use of loose fill media, such as channeling, media migration, separation, and leaking seals.

It will be appreciated that the scope of the present invention is not limited to the above-described embodiments, but rather is defined by the appended claims, and that these claims will encompass modifications of and improvements to what has been described.

What is claimed is:

1. A method of making a porous filter, the filter having a filter body integrally formed with a top cap and a bottom cap, the method comprising:
   (a) introducing a first plurality of particles into a first mold having a desired shape for the top cap, the shape defining a plurality of spaced inlet openings;
   (b) applying pressure to the first mold, thereby causing the first plurality of particles to cohere and form a green top cap;
   (c) introducing a second plurality of particles into a second mold having a desired shape for the bottom cap integrally formed with the filter body, the shape defining a plurality of spaced outlet openings extending into a plurality of spaced outlet cavities, and a plurality of blind inlet cavities with a spacing corresponding to the spacing of the inlet openings in the top cap;
   (d) applying pressure to the second mold, thereby causing the second plurality of particles to cohere and form a green integral bottom cap and filter body;
   (e) fitting the green top cap together with the green integrally formed bottom cap and filter body, whereby the inlet cavities are aligned with the inlet openings;
   (f) compressing the green fitted top cap and integral filter body and bottom cap, thereby causing the fitted top cap and integral filter body and bottom cap to cohere and form a single green component, the single component defining a plurality of blind inlet cavities and a plurality of blind outlet cavities; and
   (g) sintering the green component to form the porous filter, wherein the filter is a single-component uniform porous body having an integral structure with substantially uniform pore structure and density; and
   wherein the first and second pluralities of particles are pressed and cohere to form the top cap and the integral bottom cap and filter body without the use of a polymeric binder, and wherein the inlet and outlet cavities are formed substantially without machining.

2. The method of claim 1, wherein the pressures applied to the first and second molds are between about 3000 psi and about 5000 psi.

3. The method of claim 1, wherein the fitted top cap and integral filter body and bottom cap are compressed at a pressure between about 1500 psi and about 2500 psi.

4. The method of claim 1, wherein sintering is performed in an atmosphere of hydrogen or a blend of hydrogen and nitrogen.

5. The method of claim 4, wherein the sintering atmosphere has a dew point at or lower than 40° F.

6. The method of claim 1, wherein sintering is performed at a temperature between about 1800° F. and about 3000° F.

7. The method of claim 1, wherein sintering is performed for a time between about 20 minutes and about 2 hours.

8. The method of claim 1, wherein at least one of the first and second molds is adjustable to provide for variations in the length of the filter.

9. The method of claim 1, wherein the shape of the top cap defines a plurality of protrusions with a spacing corresponding to the spacing of the outlet cavities in the integral filter body and bottom cap, whereby the protrusions are aligned with the outlet cavities when the top cap is fitted together with the integral filter body and bottom cap.

10. The method of claim 1, wherein each of the first and second pluralities of particles comprises a metal powder.

11. The method of claim 10, wherein each metal powder has a particle size of about 1 µm or greater.

12. The method of claim 10, wherein each metal powder has a U.S. Standard Sieve mesh size between about 12 and about 500.

13. The method of claim 12, wherein each metal powder has a mesh size independently selected from the group consisting of 30/45 mesh, 50/100 mesh, and blends thereof.

14. The method of claim 10, wherein each metal powder is independently selected from the group consisting of stainless steel, nickel, tungsten, copper, bronze, and combinations thereof.

15. The method of claim 14, wherein each metal powder includes nickel.

16. The method of claim 14, wherein each metal powder includes austenitic chromium-nickel stainless steel.

17. The method of claim 10, wherein each metal powder is water atomized.

18. A method of making a porous filter, the filter having a filter body integrally formed with a top cap and a bottom cap, the method comprising:
  (a) introducing a first plurality of particles into a first mold having a desired shape for the top cap, the shape defining a plurality of spaced inlet openings;
  (b) applying pressure to the first mold, thereby causing the first plurality of particles to cohere and form a green top cap;
  (c) introducing a second plurality of particles into a second mold having a desired shape for the bottom cap, the shape defining a plurality of spaced outlet openings;
  (d) applying pressure to the second mold, thereby causing the second plurality of particles to cohere and form a green bottom cap;
  (e) introducing a third plurality of particles into a third mold having a desired shape for the filter body, the shape defining a plurality of cavities with a spacing corresponding to the spacings of the inlet openings and the outlet openings;
  (f) applying pressure to the third mold, thereby causing the third plurality of particles to cohere and form a green filter body;
  (g) fitting the green top cap, green filter body, and green bottom cap together, whereby the cavities are aligned with the inlet openings and outlet openings;
  (h) compressing the green fitted top cap, filter body, and bottom cap, thereby causing the fitted top cap, filter body, and bottom cap to cohere and form a single green component, the single component defining a plurality of blind inlet cavities extending into the filter body from the inlet openings in the top cap, and a plurality of blind outlet cavities extending into the filter body from the outlet openings in the bottom cap; and
  (i) sintering the green component to form the porous filter, wherein the filter is a single-component uniform porous body having an integral structure with substantially uniform pore structure and density; and
  wherein the first, second, and third pluralities of particles are pressed and cohere to form the top cap, filter body, and bottom cap without the use of a polymeric binder, and wherein the inlet and outlet cavities are formed substantially without machining.

19. The method of claim 18, wherein the pressures applied to the first, second, and third molds are between about 3000 psi and about 5000 psi.

20. The method of claim 18, wherein the fitted top cap, filter body, and bottom cap are compressed at a pressure between about 1500 psi and about 2500 psi.

21. The method of claim 18, wherein sintering is performed in an atmosphere of hydrogen or a blend of hydrogen and nitrogen.

22. The method of claim 21, wherein the sintering atmosphere has a dew point at or lower than 40° F.

23. The method of claim 18, wherein sintering is performed at a temperature between about 1800° F. and about 3000° F.

24. The method of claim 18, wherein sintering is performed for a time between about 20 minutes and about 2 hours.

25. The method of claim 18, wherein at least one of the first, second, and third molds is adjustable to provide for variations in the length of the filter.

26. The method of claim 18, wherein the shape of the top cap defines a first plurality of protrusions having a spacing corresponding to the spacing of the outlet openings in the bottom cap, and wherein the shape of the bottom cap defines a second plurality of protrusions having a spacing corresponding to the spacing of the inlet openings in the top cap,
  whereby the first plurality of protrusions is aligned with the outlet openings and the second plurality of protrusions is aligned with the inlet openings when the top cap, filter body, and bottom cap are fitted together.

27. The method of claim 18, wherein each of the first, second, and third pluralities of particles comprises a metal powder.

28. The method of claim 27, wherein each metal powder has a particle size of about 1 µm or greater.

29. The method of claim 27, wherein each metal powder has a U.S. Standard Sieve mesh size between about 12 and about 500.

30. The method of claim 29, wherein each metal powder has a mesh size independently selected from the group consisting of 30/45 mesh, 50/100 mesh, and blends thereof.

31. The method of claim 27, wherein each metal powder is independently selected from the group consisting of stainless steel, nickel, tungsten, copper, bronze, and combinations thereof.

32. The method of claim 31, wherein each metal powder includes nickel.

33. The method of claim 31, wherein each metal powder includes austenitic chromium-nickel stainless steel.

34. The method of claim 27, wherein each metal powder is water atomized.

* * * * *